Figure 4:
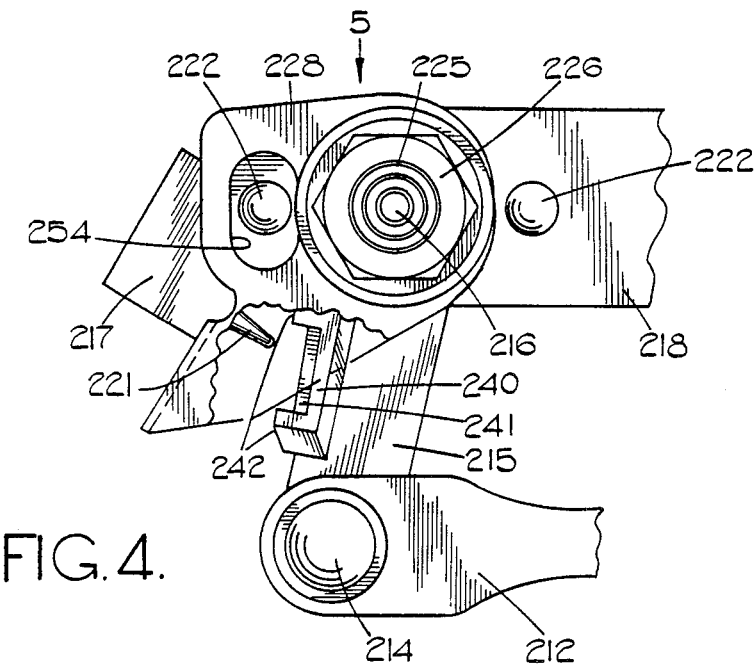

United States Patent [19]

Lane

[11] Patent Number: 4,488,071
[45] Date of Patent: Dec. 11, 1984

[54] MOTOR OPERATED MECHANISM
[75] Inventor: Robert J. Lane, Birmingham, England
[73] Assignee: Lucas Industries Public Limited Company, Birmingham, England
[21] Appl. No.: 587,126
[22] Filed: Mar. 7, 1984
[30] Foreign Application Priority Data Mar. 11, 1983 [GB] United Kingdom ............... 8306690

[51] Int. Cl.³ .............................................. H02K 5/26
[52] U.S. Cl. ............................. 310/68 B; 200/61.62; 200/153 T; 310/42; 310/91
[58] Field of Search ...... 200/61.62, 61.7, 61.76–61.78, 200/61.83, 61.41, 61.42, 153 T, 153 LB, 294, 211, 340; 248/295.1, 298, 544; 310/42, 66, 67 R, 68 B, 68 E, 69, 91

[56] References Cited
U.S. PATENT DOCUMENTS

| 2,785,256 | 3/1957 | Nina. | |
|---|---|---|---|
| 3,569,642 | 3/1971 | Grover | 200/294 |
| 3,649,781 | 3/1972 | Johnsen et al. | 200/153 T |

Primary Examiner—J. D. Miller
Assistant Examiner—D. L. Rebsch
Attorney, Agent, or Firm—Holman & Stern

[57] ABSTRACT

A windshield wiper mechanism includes a motor-driven reciprocating link oscillating on a rotary wiper-arm shaft via an arm secured to the shaft. A limit switch is slidably mounted on a fixed plate through rivets and an elongate slot and a friction material. An operating member of the limit switch is engaged by a member mounted on the arm. The limit switch is mounted so that the force required to move it relative to the plate is greater than that required to operate the operating member, but less than the maximum force which can be applied by the motor to the arm. The position of the limit switch can thus be initially set automatically. A plate on the body of the switch provides an abutment for the member on the arm so that the overwiping and unwanted locking of the mechanism is prevented by the abutment, which is automatically set in the required position initially.

12 Claims, 10 Drawing Figures

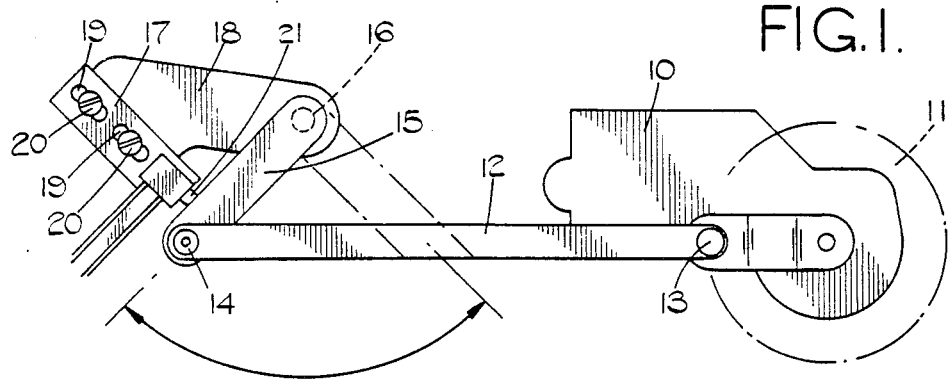
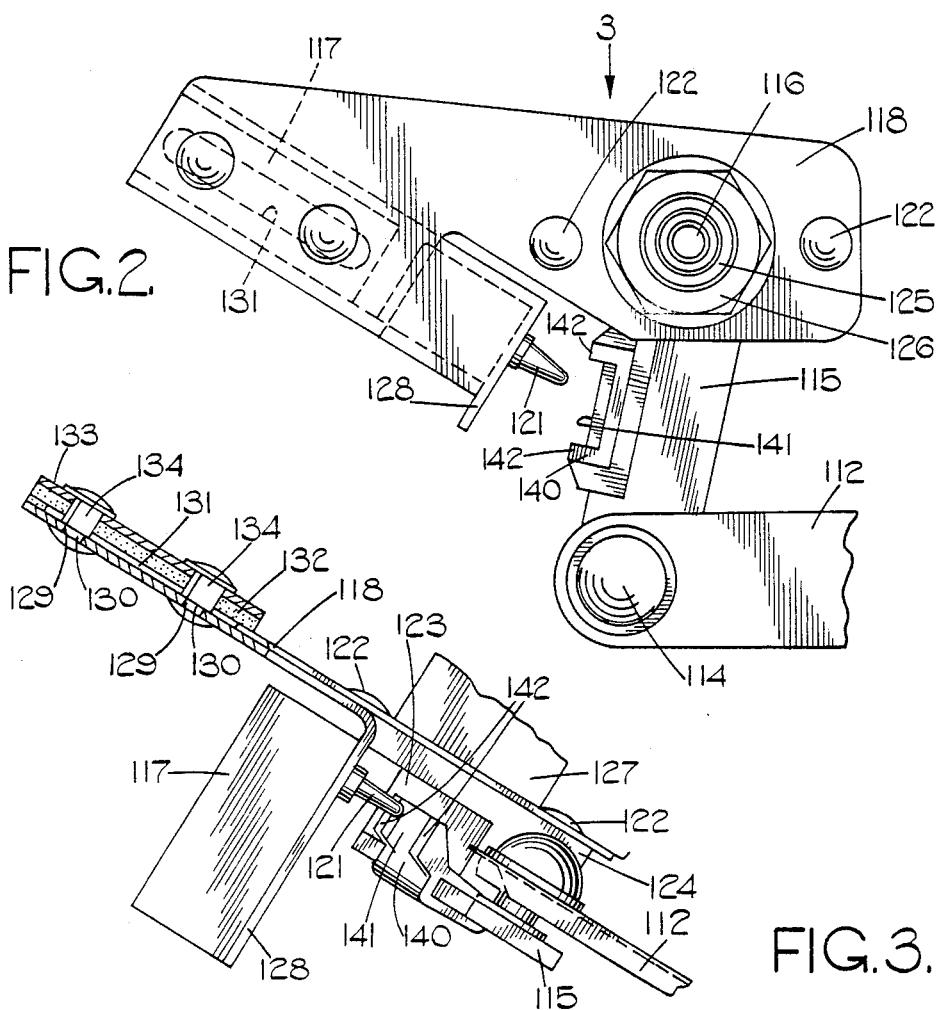

MOTOR OPERATED MECHANISM

This invention relates to a motor operated mechanism and is more particularly, though not exclusively, concerned with an electric motor operated mechanism for reciprocating one or more vehicle wipers (i.e. wiper arms and blades), for example vehicle windshield wipers.

Conventional windscreen wiper mechanisms comprise an electric motor which is arranged to oscillate one or more windshield wipers via a linkage. In order to ensure that, when such a mechanism is stopped, the wipers do not obscure the drivers vision, it is common practice to provide a limit switch which serves to cut off the power supply to the electric motor so that the wipers are stopped at a predetermined position, said predetermined position usually corresponding to a limit in the arc of travel of the wipers.

Conventionally, the above mentioned limit switch is mounted as an integral part of the motor-gearbox unit. In such an arrangement the accuracy of the wiper parking position is affected by dimensional discrepancies in the linkage system and also by the loading on the system when wiper parking is initiated.

In more complex linkage systems or where close control of the wiper parking position is required, the limit switch is mounted on the linkage in such a position as to be actuated by a moving part of the linkage. Such a system largely overcomes the above problems, but it is necessary on each vehicle installation to effect an initial setting up of the limit switch to ensure that the wipers stop in the correct position. This prodedure can be difficult and time consuming because the limit switch is usually in a relatively inaccessible position on the vehicle and moreover requires a degree of expertise on the part of the operator.

It is an object of the present invention to obviate or mitigate the above disadvantages.

According to the present invention, there is provided a motor operated mechanism including a motor, a switch mounted on a support, a member movable relative to said support, and means connecting the member to the motor so that operation of the motor causes movement of the member towards and away from a position for engaging a movable operating element of the switch, wherein means mount the switch on the support for movement by the member from an initial position into a set position, said means providing a frictional resistance to said movement of the switch such that the force required to overcome the frictional resistance is greater than the force required to move the operating element of the switch but less than the force which is capable of being applied by the motor via said member.

The motor will normally be an electric motor and the switch an electric switch. However, it is within the scope of the present invention to use an hydraulic or pneumatic motor and in which case the switch will take the form of a hydraulic or pneumatic valve.

It will be appreciated that the above defined mechanism enables automatic adjustment of the switch. Thus, before installation of the mechanism, the switch is moved into its initial position and subsequent operation of the mechanism by actuation of the motor automatically causes it to be moved into its set position, which latter position being the position in which it is intended to be located in use in the particular installation.

In one embodiment, the switch is mounted on the support through an interengaging slot and lug arrangement, there being friction means between a part associated with the switch and a part associated with the support.

In such an embodiment, it is preferred for the, or each, lug to be in the form of a rivet and for means to be provided thereon for limiting the force by which the respective parts can be urged together.

It is within the scope of the present invention to provide a construction where said member moves the switch from said initial position into said set position by direct engagement against the operating element.

However, in designs of switch where application of large forces to the operating element might cause damage of the latter, then it is preferred for said member, or for a part carried by the member, to be so formed as to be engaged directly with a body of the switch or with a part fixed relative to the body after the operating element has been moved by a distance which produces operation of the switch.

In a preferred embodiment, the switch is fixedly secured to a plate which is itself mounted on said support so as to be slidable relative to the support with frictional resistance. The sliding movement may be linear or angular.

For added security, locking means may be provided for securing the switch relative to the support in its set position. It is envisaged that, in most cases, a simple locking screw can be provided for this purpose in a relatively accessible location, bearing in mind that full access to the switch for manually setting it in the desired position is not necessary. However, other locking means as described below for the abutment may be employed.

It will be appreciated from the above that the member movable by the motor engages a relatively fixed part i.e. a part which is not moved by the motor. This acts as a stop for preventing excessive movement of the member. In the case of vehicle wiper mechanisms incorporating a pivoted link mechanism, there is the problem that excessive link movement i.e beyond the designed movement, will cause the link mechanism to overwipe and eventually to "toggle" i.e. to lock as a result of one of the pivots moving overcenter relative to another of the pivots. In order to prevent this occurring, it is usually the practice to design the mechanism with a maximum angle of wipe of about 120° so as to ensure that "toggling" does not occur even when the wiper mechanism (1) becomes worn, (2) is subjected the high pressure, e.g., high wind speeds, snow on windshield, (3) is manufactured with wide tolerances or (4) is operated at high speed. To restrict the angle of wipe, it has been previously proposed to provide one or more individually settable abutments which have to be set at appropriate positions and locked into position to suit the particular installation. As in the case of limit switch setting as described above, this is a skilled operation and access to the abutments is often restricted. Also, there is a requirement for wiper mechanisms to wipe over an angle greater than 120° with the result that "toggling" becomes a real danger.

The present invention can overcome the problem of overwiping and "toggling" by providing a positive stop for the link mechanism, the stop being settable automatically for the individual mechanism.

Thus, also according to the present invention, there is provided a motor-operated mechanism including a motor, a support, a member movable relative to the support, means connecting the member to the motor so that operation of the motor causes movement of the member towards and away from a limit position, an abutment for engagement by said member in said limit position, for preventing movement of said member beyond said limit position, and mounting means mounting said abutment on said support for movement by the member from an initial position to a set position, said mounting means providing a frictional resistance to said movement of the member such that the force required to overcome the frictional resistance is less than the force which is capable of being applied to the abutment by the motor via the member.

With such an arrangement, the position of the abutment can be set individually and automatically to suit the particular installation.

Separate locking means is preferably provided for locking the abutment in the set position. Such locking means may be in the form of a mechanical fastener, such as a screw or rivet which is secured after the locking means has been moved into the set position, or in the form of an adhesive, preferably one having a slow-setting time (e.g a two-part epoxy resin adhesive sold by CIBA-GEIGY Plastics and Additives Company (a subsidiary of CIBA-GEIGY PLC) under the Registered Trade Mark ARALDITE 2004, having a useful handling life of 2 hours at a temperture of 20° C., and reaching a full cure condition in a time interval of 8 hours at a temperature of 20° C.) or an encapsulated adhesive which becomes effective when the encapsulation is ruptured as a result of movement of the abutment into its set position (e.g a micro-encapsulated anaerobic adhesive of dimethacrylate type sold by LOCTITE (UK) Ltd. under the Registered Trade Mark LOCTITE DRI-LOC 211, rupturing as a result of a displacement of the abutment in a distance of at least 1 to to 2 mm, having a useful handling life of 10 minutes at a temperature of 20° C., and reaching a full cure condition in a time interval of 24 hours at a temperature of 20° C.) However, it is within the scope of the invention to utilize non-locking means and to rely on an increased frictional resistance of the mounting means to resist the inertia of the mechanism or to prevent "toggling", but still be within the capacity of the motor to overcome the frictional resistance during the initial setting up of the mechanism.

With a mechanism having two limit positions, an abutment and mounting means of the above described type may be provided for only one or for each of such limit positions depending upon the type of the mechanism and its susceptibility to excess movement in either or both directions.

In the case where the mechanism includes a limit switch, the limit switch may be associated with the abutment or one of the abutments so that the position of the limit switch and the associated abutment can be set automatically upon setting-up of the mechanism.

The abutment may be mounted on the support by the mounting means in any of the ways described above for the limit switch. The abutment may be defined by a buffer material on the limit switch itself or on a part relative to which the limit switch is fixedly mounted. The buffer material may be shaped or otherwise designed to give a progressively increasing buffer action. In the case of a wiper mechanism having two spaced wiper arms, and requiring abutments for both limits of travel of the linkage of the mechanism, the required two abutments may be associated with that part of the linkage mechanism driving one of the arms, or each of the two abutments may be associated with respective parts of the linkage mechanism driving the respective wiper arms.

Figure 5:
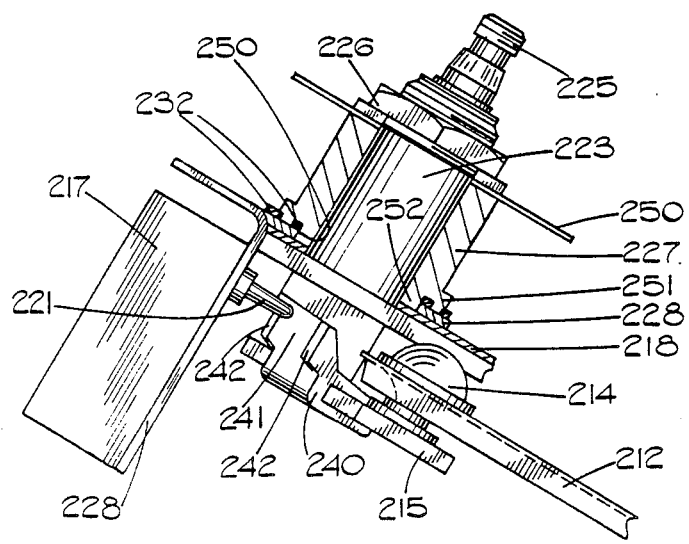
Figure 6:
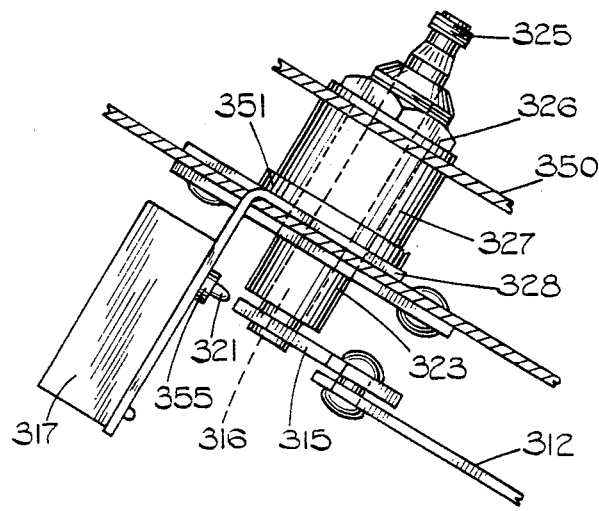
Figure 7:
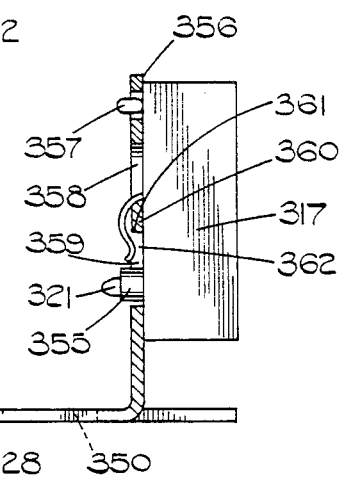
Figure 8:
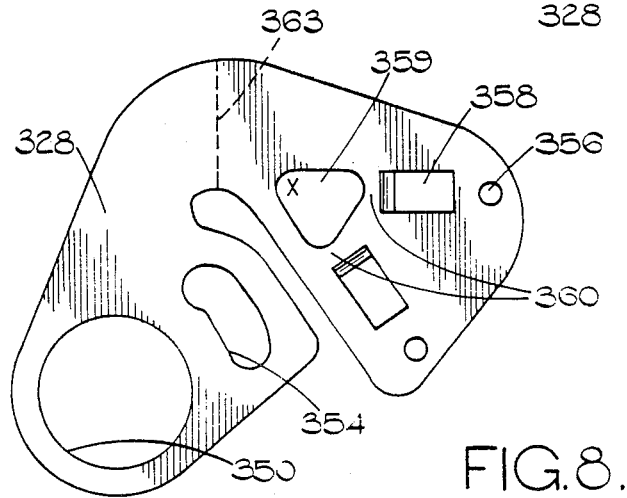
Figure 9:
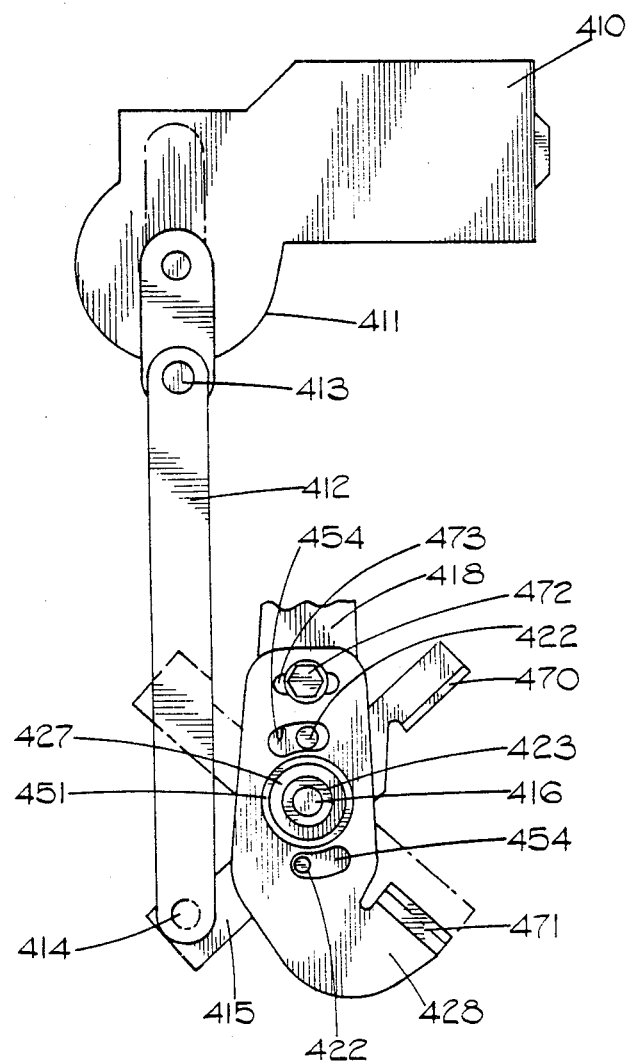
Figure 10:
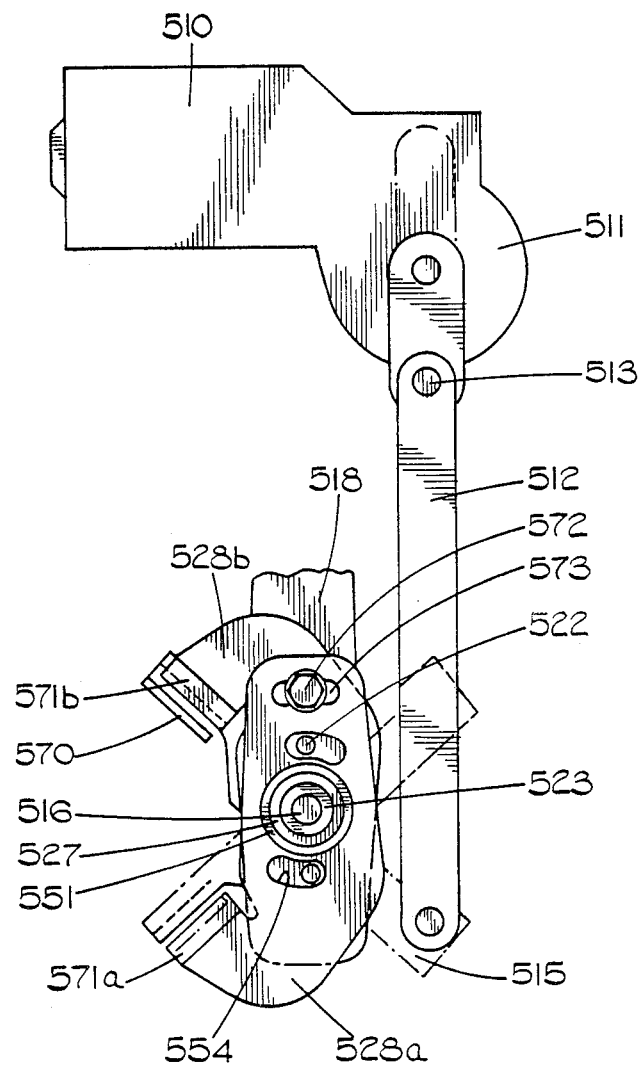

Embodiments of the present invention will now be described, by way of example, with reference to the accompanying drawings, in which:

FIG. 1 is a schematic illustration of part of a windshield wiper mechanism which is not in accordance with the present invention, FIG. 2 is a view showing part of one embodiment of windshield wiper mechanism according to the present invention, FIG. 3 is a view in the direction of arrow 3 in FIG. 2, FIG. 4 is a view similar to FIG. 2 showing part of a second embodiment of windshield wiper mechanism according to the present invention, FIG. 5 is a view in the direction of arrow 5 of FIG. 4, FIG. 6 is a view similar to FIG. 5 showing a third embodiment of the present invention, FIG. 7 is a view showing how an electric switch is mounted on a plate in the embodiment of FIG. 6, FIG. 8 is a plan view of the plate illustrated in FIGS. 6 and 7 but shown in an unbent form, FIG. 9 is a plan view of a fourth embodiment of windshield wiper mechanism according to the present invention, and FIG. 10 is a plan view of a fifth embodiment of windshield wiper according to the present invention.

Referring now to FIG. 1 of the drawings, the windshield wiper mechanism illustrated therein comprises basically an electric motor 10 which drives a worm wheel 11 through the intermediary of a worm (not shown). The worm wheel 11 in turn drives a connecting link 12. The connecting link 12 is pivotally connected at 13 with the worm wheel 11 and pivotally connected at the other of its ends 14 with a member in the form of an arm 15. The lower end of the arm 15 is pivotally connected with link 12 while its upper end is connected to one end of an oscillatable shaft 16. The opposite end of shaft 16 to arm 15 is provided with a splined formation (not shown in FIG. 1) upon which a windshield wiper arm carrying a windshield wiper blade is mounted in a manner known per se. Although not illustrated in FIG. 1, the electric motor 10 also drives another wiper blade and arm by means of a separate arrangement of oscillatable shaft, arm and connecting rod similar to the shaft 16, arm 15 and rod 12 described above. An electrical limit switch 17 stops the electric motor 10 with the mechanism in a position such that the wipers are located so as not to obscure the vision through the windshield. The switch 17 is mounted on a plate 18, fixed relative to the body of the motor vehicle, and has slots 19. Fixing screws 20 extend respectively through the slots 19 to engage in internally screw-threaded holes in the plate 18. In use, the windshield wiper mechanism described above is installed in a motor vehicle and the wiper arms are attached to the splined formations described above. The electrical switch 17 is then manually adjusted with the screws 20 untightened by sliding the switch bodily relative to plate 18 as permitted by slots 19 until the switch 17 is in the correct position relative to arm 15. It is to be appreciated that the limit switch 17 is wired into the electrical supply to the motor 10 in parallel with a manually operable switch (not shown) disposed within reach of the driver of the vehicle so that when the manually operated switch is opened, electrical supply to the motor 10 occurs only through the switch 17. The switch 17 has an operating element 21 which is disposed in the path of movement of the arm 15. The switch 17 has to be adjusted in position so that the operating element 21 is contacted by arm 15 to open switch 17 when arm 15 is in a position such that the wipers in their correct position when the motor 10 stops. Thus, it is a relatively skilled job to set the position of the switch 17 correctly because (1) access to the mechanism in the region of the switch 17 is restricted, (2) the position of the switch 17 is very critical because small changes in the angular position of the arm 15 produce relatively large variations in the position of the wiper blade because the latter is on the end of a relatively long wiper arm, and (3) it is necessary to set the position of the switch 17 by trial and error.

Referring now to FIG. 2, the wiper mechanism of which part is illustrated in FIG. 2 is similar to the arrangement of FIG. 1 except for the mounting of switch 17 on plate 18. Accordingly, parts of the mechanism of FIGS. 2 and 3 which are similar to those of FIG. 1 will be accorded the same reference numeral but in the 100 series. In this embodiment, plate 118 is securely riveted at 122 to a body 123 provided with a flange 124. Oscillatable shaft 116 extends through the body 123 which provides a bearing for the former. The splined formation on the outer end of the shaft 116 is shown at 125 in FIG. 2. The body 123 is fixedly mounted on a panel (not shown) of the motor vehicle body by way of a nut 126 and a sleeve 127 between which the panel is clamped, the nut 126 being mounted on a screw-threaded portion of the body 123 and the sleeve 127 engaging against plate 118 secured to flange 124. The switch 117 is fixedly mounted on one arm of an L-shaped plate 128. The other arm of the plate 128 has a pair of apertures 129. A rivet stud 130 passes through each of the apertures 129, through a common elongate slot 131 in the plate 118, through a pad of friction material 132 and through a backing plate 133. The ends of each rivet stud 130 are spread over to hold the assembly of plate 128, plate 118, friction pad 132, and backing pad 133 together. Although not essential, the stud 130 has a portion 134 having a greater diameter than aperture 129. This serves to limit the force by which the above mentioned components can be urged together. Such an arrangement provides a construction which enables plate 128 to slide relative to plate 118 as permitted by movement of the rivet studs 130 and portions 134 in the elongate slot 131, with a frictional resistance to such movement which is such that the force required to move plate 128 relative to plate 118 is greater than the force required to operate the switch 117 by depression of operating element 121 but less than the force which can be exerted on the plate 128 by the electric motor 10 via the linkage by which arm 115 is connected with the motor 10.

Because the switch 117 is of a type which could be damaged if the operating element were subjected to the relatively large forces required to move the plate 128, the arm 115 is fitted with a plastics moulding 140 provided with a recess 141 therein whose base is adapted to engage the operating element 121. The molding 140 has abutment portions 142 on opposite sides of the recess 141 which engage against the plate 128 on either side of the operating element 121 to effect the aforesaid movement of the plate 128. For this purpose, the depth of recess 141 is such that the operating element 121 is moved by its designed amount to open the contacts of switch 117 and immediately afterwards which the abutment portions 142 engage against plate 128 during initial setting up of the mechanism as will now be described.

Before the above described mechanism is installed, the plate 128 is moved relative to the plate 118 so that switch 117 is at an initial position where right hand sleeve 134 is engaged against the right hand end of slot 131 in the plate 118 (as viewed in FIG. 2). When the mechanism has been installed, the manually operable switch is operated so as to cause the motor 10 to rotate and the wipers to be oscillated. The arrangement is such that when arm 115 is at the limit of its travel in a clockwise direction (as viewed in FIG. 2), the wipers are in a "parked" position such that they do not obscure the driver's view through the windscreen. When the motor is operated for the first time, molding 140 carried by arm 115 engages against the operating element 121 to operate the switch, but because electrical supply to the motor 10 is maintained through the manually operable switch, the motor continues to run thus further moving the arm 15 in a clockwise direction. Such further movement causes the abutment portions 142 to abut against the plate 128 and to move it and switch 117 away from the initial position of the latter and towards a set position thereof which is to the left of the initial position (as viewed in FIG. 2). During the first cycle of oscillation of the arm 115, it is possible that the plate 128 and switch 117 will not have been moved fully into the set position. However, continued operation of motor 10 will cause switch 117 quickly to adopt its set position where the limit of oscillatory movement of arm 115 in the clockwise direction brings shoulders 142 merely into touching engagement with the adjacent surface of plate 128. The depth of recess 141 is chosen to be such that, under these conditions, the operating element 121 is sufficiently depressed to open the switch.

It will be appreciated that not only does the mechanism of FIG. 2 provide for initial setting of the limit switch 117, it also provides for initial setting of an abutment (plate 128) which can restrict the angle of wipe of the mechanism in one of its limit positions. A suitable buffer material (not shown) is provided on plate 128 for absorbing the shock of contact with the portions 142.

It is considered that the resistance to movement of the plate 128 relative to the plate 118 is sufficient to prevent it from moving out of its set position in service, bearing in mind that initial setting up will normally be effected under no-load conditions (i.e. without the vehicle wipers engaging the screen) so that the maximum possible motor power is available for moving plate 128 which can therefore be arranged to have a considerable resistance to movement. However, it is within the scope of the present invention to provide a means such as a locking screw to prevent such relative movement after the initial setting up of the mechanism. In this latter case, the frictional resistance to movement can be decreased, if desired.

Referring now to FIGS. 4 and 5, the mechanism illustrated therein operates in a similar way to that described above with reference to FIGS. 2 and 3 and similar parts are accorded the same reference numerals but in the 200 series. In this embodiment, plate 228 carrying switch 217, instead of being spaced from body 223, is provided with a circular aperture 250 through which body 223 passes. The plate 228 is rotatable relative to the body 223 but is trapped between plate 218 and a large diameter end portion 251 of sleeve 227.

Rings 232 formed of a friction material are disposed in respective recesses in the portion 251 and abut against the adjacent surface of plate 228. Sleeve 227 is provided with a bearing portion 252 of a diameter such that the wall of the aperture 250 in plate 228 is a rotary sliding or frictional fit therewith. The axial length of the bearing portion 252 is equal to or slightly less than the thickness of plate 228. This feature serves to prevent plate 228 from being clamped too tightly when nut 226 is tightened during fitting of the mechanism to panel 250 of the motor vehicle. When nut 226 has been tightened so as to secure body 223 and associated parts mounted thereon in position, plate 228 is angularly movable relative to the body 223 through a limited arc. The movement of plate 228 is limited by virtue of engagement of the head of one of rivets 222 in a slot 254 in the plate 228. As mentioned above, the mechanism of FIGS. 4 and 5 operates in a similar way to that of FIGS. 2 and 3, with the plate 228 and limit switch 217 being moved in an arc from the initial position to the set position as opposed to being linearly moved as in the case of plate 128 and switch 117 described with reference to FIGS. 2 and 3.

In the embodiment shown in FIGS. 6 to 8, the arrangement of the respective parts is very similar to that illustrated in FIGS. 4 and 5 and corresponding parts are accorded the same reference numerals but in the 300 series. In the embodiment of FIGS. 6 to 8, switch 317 has an operating element 321 which is designed to be pushed fully into the switch 317 to open the contacts of the switch. Thus, there is no risk of damage to the switch by the arm and so it is arranged to be engaged directly by the edge of arm 315. Thus, when the element 321 has been fully depressed, the arm 315 abuts against a projecting portion 355 of the body of switch 317 to urge switch 317 and the plate 328 from the initial position to the set position of the switch 317. The projecting portion 355 thus acts as an abutment for preventing overwipe of the mechanism in a similar way to plates 128 and 228.

The manner in which the switch 317 is mounted on the plate 328 is illustrated in FIG. 7. The plate 328 is provided with an aperture 356 in which a locating peg 357 on switch 317 is engaged. The plate 328 is also provided with a slot 358 and a hole 359 between which there is defined a land 360 having a ramp surface 361. A configurated spring retainer blade 362 is provided on the switch 317 for snap engagement with the land 360.

The projection 355 and operating element 321 extend through the hole 359.

Referring now to FIG. 8, the plate 328 is shown in an unbent form and is provided with two apertures 356, two slots 358, two lands 360, but with a single hole 359 which is triangular. This arrangement of plate enables the limit switch assembly to be mounted on either of the bodies 310 associated with the left and right hand wiper blades in a two-wiper blade system. For this purpose, the plate 328 will be bent in the appropriate direction about dotted line 363 to produce the required L-shape to the blade, and the limit switch 317 will be engaged with the appropriate set of hole 356, slot 358 and land 360.

The manner of mounting the switch 317 on the plate 328 and the shape of the latter as described with reference to FIGS. 7 and 8 are also applicable to the switch 217 and plate 228 of the embodiment of FIGS. 4 and 5.

Referring now to FIG. 9, parts similar to the previous embodiments are acorded the same reference numerals but in the 400 series. In this embodiment, however, the limit switch is not illustrated and the mechanism as illustrated is designed to prevent overwipe and "toggling" of the wipers in one direction of their arc of travel.

Motor 410 reciprocates link 412 via wormwheel 411 and in turn oscillates arm 415 about the axis of shaft 416 to effect oscillation of the latter. The arm 415 is extended on the opposite side of the shaft 416 to its pivotal connection at 414 with link 412 and terminates in an upstanding portion 470 having a flat abutment surface extending parallel to the radial direction in respect of the axis of shaft 416. Plate 428 is mounted to be rotatable relative to body 423 in the same way as plate 228 is rotatable relative to body 223 and likewise is trapped between plate 418 (only partly shown) and large diameter end portion 451 of sleeve 427. In a like manner to the embodiment of FIGS. 4 and 5, rings (not shown) corresponding to rings 232 of friction material are disposed in respective recesses in the portion 451 and abut against the adjacent surface of plate 428. Slots 454 accommodate rivets 422 to limit angular movement of the plate 428 relative to plate 418 in a like manner to the plates 228 and 218.

The plate 428 has an upstanding flange fitted with an abutment 471 facing the upstanding portion 470 and arranged in the path of movement of the latter. The abutment 471 is defined by a portion of elastomeric buffer material which has a progressive buffering action. Initial setting of the abutment 471 is effected in a similar manner to that described in relation to the limit switch of FIGS. 4 and 5. Locking screw 472 which engages an internally screw threaded bore in plate 418 can be clamped onto plate 428 to lock it into position after the initial setting operation has been performed. The screw 472 passes through an arcuate slot 473 in the plate 428 to permit movement of the plate 428 about the axis of shaft 416 prior to tightening of the screw 472.

The mechanism of FIG. 9 may be fitted with a limit switch mounted on plate 428 if desired. If necessary, a similar cooperating abutment and upstanding portion to abutments 471 and portion 470 may be provided on the part of the mechanism which is not illustrated in FIG. 9 i.e. that part which drives the shaft associated with the other wiper arm from the motor 410. Such similar cooperating abutments and upstanding portions are arranged to prevent overwipe and "toggling" in the opposite direction of the arc of travel of the wipers, it being appreciated that the parts of the link mechanism for both wiper arms are mounted so as to be moved simultaneously by the motor 410. Because of this, it is possible to provide abutments for preventing overwipe and "toggling" in both directions of oscillation of the wiper arms using a pair of abutments associated with that part of the mechanism which drives one of the wiper arms.

This is illustrated in FIG. 10 where parts similar to those of FIG. 9 are accorded the same reference numerals but in the 500 series. The embodiment of FIG. 10 operates in the same way as that of FIG. 9 except that two plates 528a and 528b are provided with respective abutments 571a and 571b thereon. The abutments 571a and 571b are disposed at opposite ends of the arc of movement of upstanding portion 570 on arm 515. The plates 528a and 528b are in facial abutment, with plate 528a being engaged by friction material rings (not shown) in end portion 551 of sleeve 527, and with plate 528b being abutted against plate 518. Arcuate slots 554 and 573 are provided in both plates 528a and 528b and are respectively mutually aligned for engagement by rivets 522 and locking screws 572 respectively. In the embodiment of FIG. 10, the limit switch may be mounted on the appropriate one of the plates 528a and 528b or it may be mounted in accordance with the invention on the part of the mechanism which is not shown in FIG. 10 and which is provided for driving the shaft associated with the other wiper arm.

Whilst the above described embodiments relate to windscreen wiper mechanisms and limit switches for stopping the electric motor at a position corresponding to a parked position of the wipers and/or abutments for preventing overwipe and "toggling", it is to be appreciated that the invention is applicable to any motor operated mechanisms, rotary or otherwise, where the positioning of a switch or abutment relative to a moving portion of the operating mechanism is critical.

It will be further be appreciated from the above that, in all of the embodiments described, stepless adjustment of the switch and/or abutment(s) occurs automatically so that very precise positioning of it is possible.

I claim:

1. A motor-operated mechanism including a motor, a switch mounted on a support, a member movable relative to said support, and means connecting the member to the motor so that operation of the motor causes movement of the member towards and away from a position for engaging a movable operating element of the switch, wherein means mount the switch on the support for movement by the member from an initial position into a set position, said means providing a frictional resistance to said movement of the switch such that the force required to overcome the frictional resistance is greater than the force required to move the operating element of the switch but less than the force which is capable of being applied by the motor via said member.

2. A mechanism as claimed in claim 1, wherein the switch is mounted on the support through an interengaging slot and lug arrangement, there being friction means between a part associated with the switch and a part associated with the support.

3. A mechanism as claimed in claim 2, wherein the or each lug is in the form of a rivet and means are provided on the rivet for limiting the force by which the respective parts can be urged together.

4. A mechanism as claimed in claim 1, wherein said member, or a part carried by the member, is so formed as to be engaged directly with a body of the switch or with a part fixed relative to the body of the switch after the operating element has been moved by a distance which produces operation of the switch.

5. A mechanism as claimed in claim 1, wherein the switch is fixedly secured to a plate which is itself mounted on said support so as to be slidable relative to the support with frictional resistance.

6. A mechanism as claimed in claim 1, wherein the member comprises an arm which is secured to a rotary shaft angularly oscillatable in a body fixed relative to the support, wherein the switch is mounted on a plate which is angularly movable relative to the body about the axis of the shaft, and wherein friction means impart a frictional resistance to movement of the plate relative to the support.

7. A mechanism as claimed in claim 1, wherein locking means are provided for securing the switch in its set position relative to the support.

8. A motor operated mechanism including a motor, a support, a member movable relative to the support, means connecting the member to the motor so that operation of the motor causes movement of the member towards and away from a limit position, an abutment for engagement by said member in said limit position for preventing movement of said member beyond said limit position, and mounting means mounting said abutment on said support for movement by the member from an initial position to a set position, said mounting means providing a frictional resistance to said movement of the member such that the force required to overcome the frictional resistance is less than the force which is capable of being applied to the abutment by the motor via the member.

9. A mechanism as claimed in claim 8, wherein means are provided for securing said member in its set position.

10. A mechanism as claimed in claim 8, wherein the member comprises an arm which is secured to a rotary shaft angularly oscillable in a body fixed relative to the support, wherein the abutment is mounted on a plate which is angularly movable relative to the body about the axis of the shaft, and wherein friction means impart a friction resistance to movement of the plate relative to the support.

11. A mechanism as claimed in claim 8, including a switch having a body mounted on said support through the intermediary of said mounting means, wherein the abutment is provided by a part on the body of the switch, and wherein the member or a part movable therewith is engageable with an operating element of the switch.

12. A mechanism as claimed in claim 8, including an electrical limit switch for controlling said motor, said switch being mounted on said support through the intermediary of said mounting means and having an operating element disposed to be engageable by said member or a part movable with said member.

* * * * *